(12) United States Patent
Kim et al.

(10) Patent No.: US 8,774,221 B2
(45) Date of Patent: Jul. 8, 2014

(54) APPARATUS AND METHOD FOR REPORTING BUFFER STATUS OF UE IN MOBILE COMMUNICATION SYSTEM

(75) Inventors: Seong-Hun Kim, Suwon-si (KR); Gert-Jan Van Lieshout, Staines Middlesex (GB)

(73) Assignee: Samsung Electronics Co., Ltd. (KR)

( * ) Notice: Subject to any disclaimer, the term of this patent is extended or adjusted under 35 U.S.C. 154(b) by 239 days.

(21) Appl. No.: 13/320,444

(22) PCT Filed: May 11, 2010

(86) PCT No.: PCT/KR2010/002976
§ 371 (c)(1),
(2), (4) Date: Jan. 30, 2012

(87) PCT Pub. No.: WO2010/131884
PCT Pub. Date: Nov. 18, 2010

(65) Prior Publication Data
US 2012/0113922 A1    May 10, 2012

(30) Foreign Application Priority Data

May 11, 2009  (KR) .................. 10-2009-0040813

(51) Int. Cl.
*H04J 3/24*   (2006.01)
(52) U.S. Cl.
USPC ......................................... 370/474; 370/392

(58) Field of Classification Search
USPC ........... 370/392, 389, 473–476, 329; 455/450
See application file for complete search history.

(56) References Cited

U.S. PATENT DOCUMENTS

| 7,796,648 B2 * | 9/2010 | Joo et al. ...................... 370/474 |
| 2006/0268798 A1 | 11/2006 | Kim et al. |
| 2009/0052388 A1 * | 2/2009 | Kim et al. ..................... 370/329 |

FOREIGN PATENT DOCUMENTS

| EP | 1511245 | 3/2005 |
| EP | 2026617 | 2/2009 |

OTHER PUBLICATIONS

PCT/ISA/237 Written Opinion issued on PCT/KR2010/002976 (pp. 3).
PCT/ISA/210 Search Report issued on PCT/KR2010/002976 (pp. 4).

* cited by examiner

*Primary Examiner* — Dady Chery
(74) *Attorney, Agent, or Firm* — The Farrell Law Firm, P.C.

(57) ABSTRACT

A method for reporting buffer status of a User Equipment (UE) in a mobile communication system is provided. The method for reporting buffer status of the UE in the mobile communication system includes being allocated a transmission resource from a node B; determining information to add to a certain region of a first Medium Access Control (MAC) subheader through an N-th MAC subheader using the transmission resource; generating a MAC Protocol Data Unit (PDU) by concatenating the first MAC subheader through the N-th MAC subheader with corresponding payload elements; and transmitting the generated MAC PDU.

14 Claims, 9 Drawing Sheets

APPARATUS AND METHOD FOR REPORTING BUFFER STATUS OF UE IN MOBILE COMMUNICATION SYSTEM

TECHNICAL FIELD

The present invention relates generally to a buffer state report of a UE in a mobile communication system. More particularly, the present invention relates to a method and an apparatus for efficiently reporting buffer status of a UE using two bits unused in a packet header of the UE.

BACKGROUND ART

In general, mobile communication systems are developed to provide mobility of communications to users. The mobile communication system makes rapid technical advance and provides a high speed data communication service as well as voice communications.

As one of next-generation mobile communication systems, $3^{rd}$ Generation Partnership Project (3GPP) is working on the standardization of Long Term Evolution (LTE). An LTE system, which aims for its commercialization in about 2010, is to provide a high speed packet based service of a data rate of about 100 Mbps at maximum higher than the data rate currently serviced.

To provide the high speed packet based service of the data rate of about 100 Mbps at maximum, a method for reducing the number of nodes in a communication path by simplifying a network structure or a method for making wireless protocols close to the wireless channel as much as possible is under discussion.

Meanwhile, the data service, unlike the voice service, in the mobile communication system determines the allocable resources based on the data amount to transmit and the channel status. The wireless communication system such as mobile communication system performs management to allocate the transmission resource by taking into account the resource amount to transmit at from scheduler, the channel status, and the data amount. This also applies to the LTE which is one of the next-generation mobile communication systems. That is, in the LTE system, the scheduler of a base station manages and allocates the wireless transmission resources.

The wireless communication system such as mobile communication system separates a forward transmission and a reverse transmission based on the transmission direction of the data. The forward direction indicates the direction from the base station to a terminal, and the reverse direction indicates the direction from the terminal to the base station.

In the forward transmission, the base station can accurately determine the data amount to transmit. Since the base station can accurately determine the channel status, the resource amount, and the amount of the data to transmit, the scheduler can normally accomplish the scheduling.

However, in the allocation of the reverse wireless transmission resource, the scheduler of the base station may allocate the resource while not accurately detecting a buffer status of the terminal.

In the LTE system, the terminal reports the buffer status to the base station using a buffer status report control element. The buffer status report control element is transmitted only when a particular condition is satisfied. As a result, the base station cannot accurately know the buffer status of the terminal all the time.

DISCLOSURE OF INVENTION

Solution to Problem

An aspect of the present invention is to address at least the above-mentioned problems and/or disadvantages and to provide at least the advantages described below. Accordingly, an aspect of the present invention is to provide an apparatus and a method for reporting buffer status of a terminal in a mobile communication system.

Another aspect of the present invention is to provide a method and an apparatus for reporting buffer status to a base station using two bits, of which use is not defined, of a header of a packet transmitted from a terminal to the base station in a mobile communication system.

According to one aspect of the present invention, a method for reporting buffer status of a User Equipment (UE) in a mobile communication system includes being allocated a transmission resource from a node B; determining information to add to a certain region of a first Medium Access Control (MAC) subheader through an N-th MAC subheader using the transmission resource; generating a MAC Protocol Data Unit (PDU) by concatenating the first MAC subheader through the N-th MAC subheader with corresponding payload elements; and transmitting the generated MAC PDU.

According to another aspect of the present invention, a method for informing of a buffer transmission order of a UE at a node B in a mobile communication system includes establishing a Radio Resource Control (RRC) connection with the UE; generating information relating to which subheader is related to an LCG; and sending the information relating to which subheader is related to the LCG through the RRC connection.

According to still another aspect of the present invention, an apparatus of a UE for reporting buffer status in a mobile communication system includes a control element generator for being allocated a transmission resource from a node B, and determining information to add to a certain region of a first MAC subheader through an N-th MAC subheader using the transmission resource; a multiplexer and demultiplexer for generating a MAC PDU by concatenating the first MAC subheader through the N-th MAC subheader with corresponding payload elements according to the determination of the control element generator; and a transceiver for transmitting the generated MAC PDU.

According to yet another aspect of the present invention, an apparatus of a node B for informing of a buffer transmission order of a UE in a mobile communication system includes a control channel process for establishing a RRC connection with the UE; a control element generator for generating information relating to which subheader is related to an LCG; and a transceiver for sending the information relating to which subheader is related to the LCG through the RRC connection.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method and an apparatus for a UE to report its buffer status to a node B by efficiently defining two bits.

Figure 1:
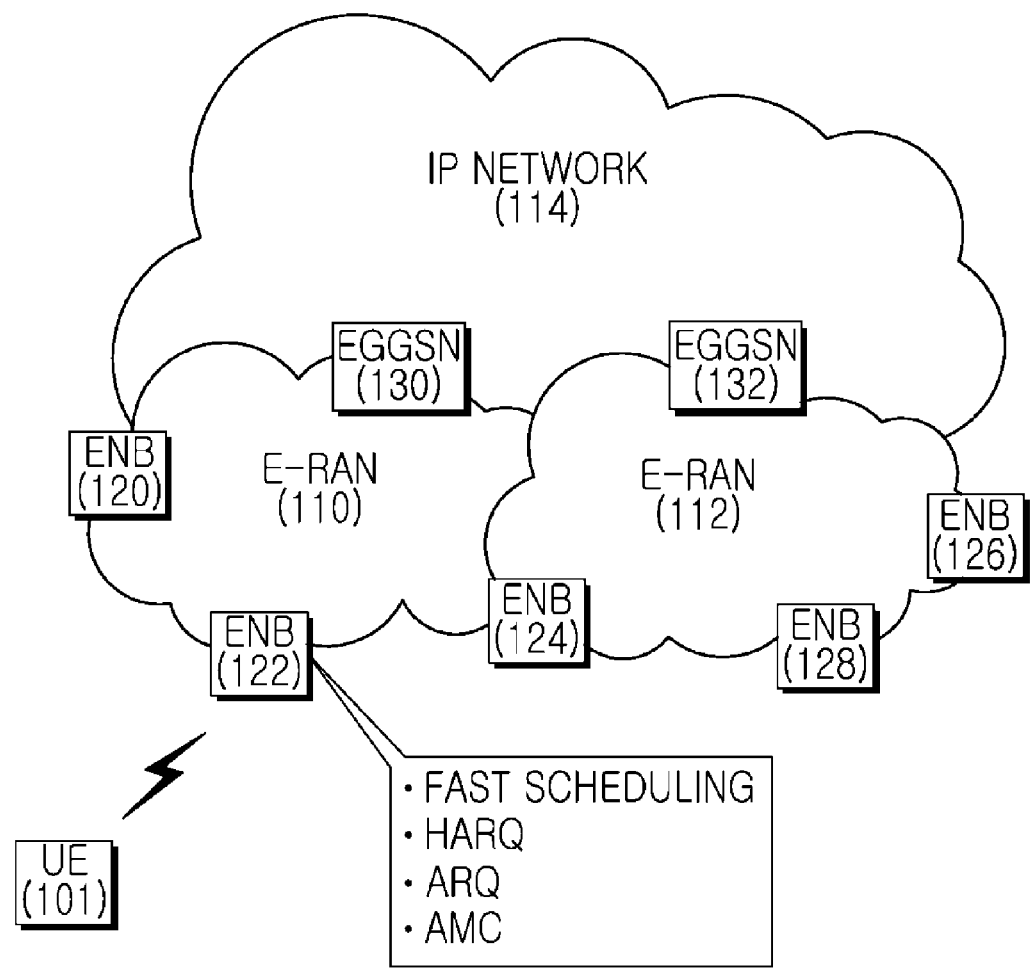
FIG. 1 is a diagram of a structure of a LTE mobile communication system according to an exemplary embodiment of the present invention.

FIG. 1 is a diagram of a structure of a LTE mobile communication system according to an exemplary embodiment of the present invention.

Referring to FIG. 1, Evolved Radio Access Networks (E-RANs) 110 and 112 are simplified in a two-node structure including Evolved Node Bs (ENBs or Node Bs) 120, 122, 124, 126 and 128, and Evolved Gateway GPRS Support Nodes (EGGSNs) 130 and 132 which are upper nodes.

A User Equipment (UE) 101 accesses an Internet Protocol (IP) network 114 via the E-RANs 110 and 112.

The ENBs 120 through 128 correspond to existing node Bs of a Universal Mobile Telecommunications System (UMTS). The ENBs 120 through 128 are connected with the UE 101 over radio channels and perform more complicated functions than the existing node Bs.

In the LTE system, every user traffic including real-time services such as Voice over IP (VoIP) is serviced through a shared channel using the Internet protocol. Accordingly, an apparatus for aggregating and scheduling status information of the UEs is required, and the ENBs 120 through 128 carry out the corresponding scheduling.

One ENB generally controls a plurality of cells. To realize the transfer rate of 100 Mbps at maximum, the LTE system adopts an Orthogonal Frequency Division Multiplexing (OFDMA) scheme as the radio access technology in the maximum 20 MHz bandwidth.

Also, the LTE system adopts an Adaptive Modulation & Coding (AMC) scheme which determines a modulation scheme and a channel coding rate in accordance with the channel status of the UE. In the communication with the UE 101, the LTE system uses Automatic Repeat reQuest (ARQ) and Hybrid Automatic Repeat reQuest (HARM) techniques.

Figure 2:
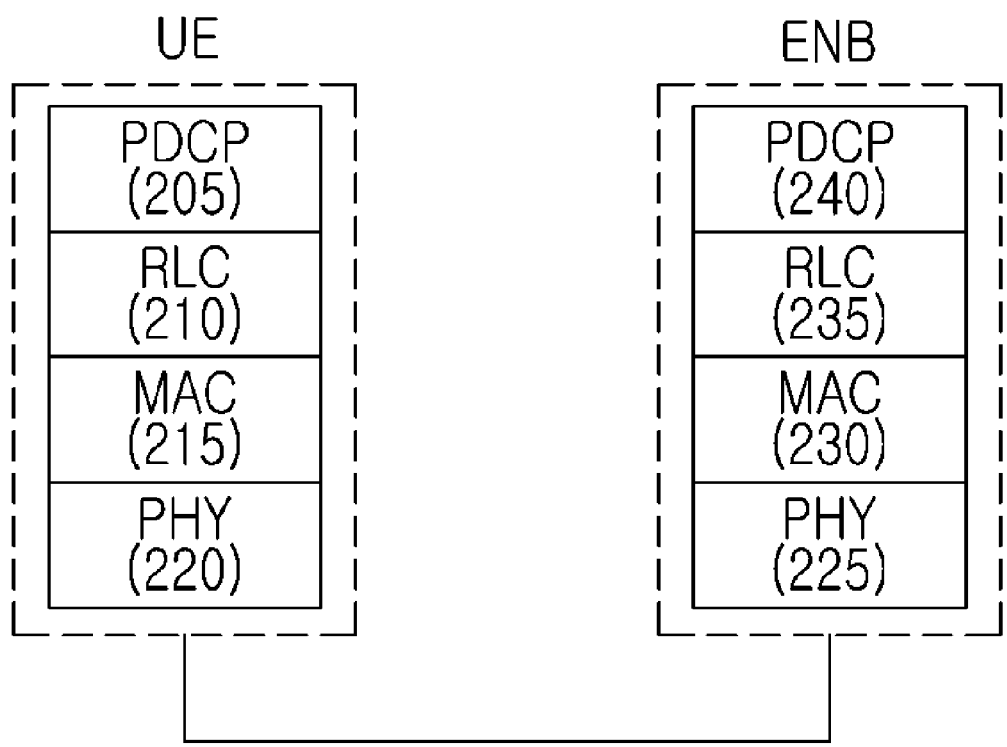
FIG. 2 is a diagram of a wireless protocol stack architecture of the LTE system according to an exemplary embodiment of the present invention.

FIG. 2 is a diagram of a wireless protocol stack architecture of the LTE system according to an exemplary embodiment of the present invention.

Referring to FIG. 2, the wireless protocol of the LTE system includes Packet Data Convergence Protocol (PDCP) 205 and 240, Radio Link Control (RLC) 210 and 235, and Medium Access Control (MAC) 215 and 230.

The PDCP 205 and 240 manages operations such as IP header compression/decompression. The RLC 210 and 235 performs the Automatic Repeat reQuest (ARQ) operation by reconstructing a PDCP Packet Data Unit (PDU) (hereafter, the packet output from a particular protocol layer device is referred to as a PDU of the protocol) in an appropriate size.

The MAC 215 and 230 is linked with the plurality of the RLCs in one UE or ENB, and multiplexes RLC PDUs to a MAC PDU. The MAC 215 and 230 demultiplexes RLC PDUs from the MAC PDU.

A physical layer 220 and 225 channel-codes and modulates the upper layer data, generates OFDM symbols, sends the OFDM symbols over the radio channel, demodulates and channel-decodes OFDM symbols received via the radio channel, and forwards them to the upper layer.

Based on the transmission, the data input to a protocol entity is referred to as a Service Data Unit (SDU), and the output data is referred to as a Protocol Data Unit (PDU).

Figure 3:
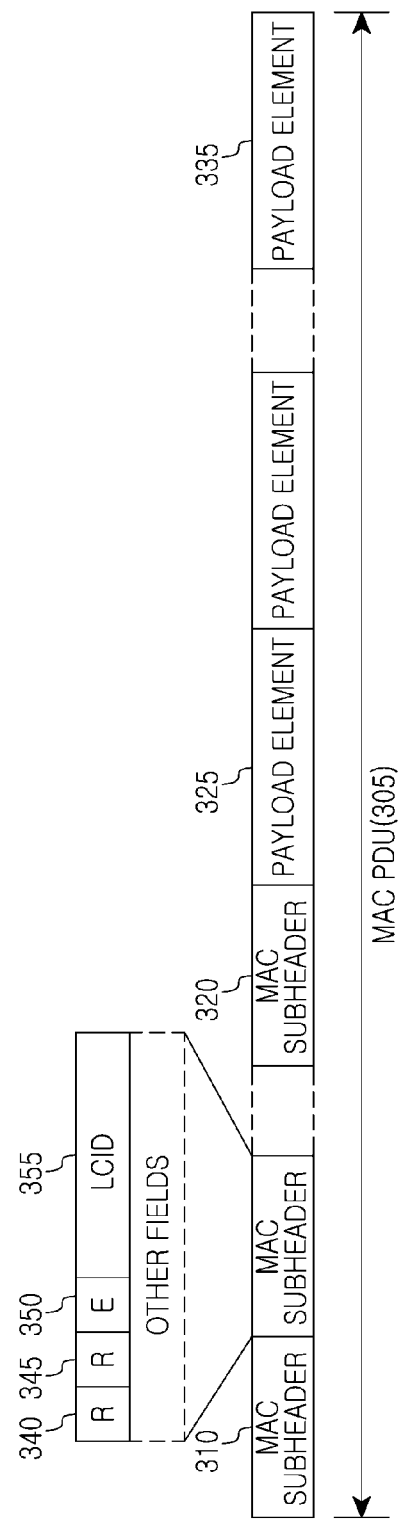
FIG. 3 is a diagram of a structure of a MAC PDU according to an exemplary embodiment of the present invention.

FIG. 3 is a diagram of a structure of the MAC PDU according to an exemplary embodiment of the present invention.

Referring to FIG. 3, the MAC PDU 305, which is multiplexed in the MAC layer from the upper layer data (MAC PDU) or a Control Element (CE) of the MAC layer, includes a plurality of MAC subheaders and Payload Elements (PEs) of the same number. The PE indicates the MAC PDU or the MAC CE.

One MAC subheader includes multiplexing information of one PE, and the order of the MAC subheaders determines the MAC subheader and the PE related.

For example, the first MAC subheader 310 includes the multiplexing information of the first PE 325, and the last MAC subheader 320 includes the multiplexing information of the last PE 335.

The MAC subheader includes two bits 340 and 345 of which the use is not defined (hereafter, referred to as R bits), an E bit 350, a Logical Channel ID (LCID) 355, and other fields.

The LCID 355 is information indicating which device (or layer) the corresponding PE is transmitted to. When the PE is the MAC SDU, the identifier of the logical channel is contained. When the PE is the MAC CE, information indicative of the type of the MAC CE is contained.

The logical channel is the identifier assigned to the RLC and the PDCP constituted for one stream. That is, a receiver determines which RLC the corresponding MAC SDU is to be forwarded to, by referring to the logical channel identifier.

The other fields, for example, include information indicative of the size of the corresponding PE, and may be used or not in some cases. The presence of the other fields is instructed by the E field 350.

One MAC PDU can include a plurality of MAC subheaders. Two R bits are given to each subheader.

The present invention provides a method and an apparatus for reporting the buffer status of the UE using the two R bits. Also, the present invention provides the method and the apparatus for reporting the buffer status of the UE according to four exemplary embodiments.

First, one exemplary embodiment is described.

In one exemplary embodiment of the present invention, the UE repots the buffer status of a Logical Channel Group (LCG) using the R bits of the MAC subheader.

The LCG of which the buffer status is to be reported using the R bits of the MAC subheader, is determined by a location of the corresponding MAC subheader. The LCG determines the location of the MAC subheader and the transmission time of the MAC PDU using the transmission time of the MAC PDU so that the relation between the location of the MAC subheader and the LCG is not fixed.

Hereafter, the LCG is briefly explained prior to its detailed descriptions.

The LCG is a set of logical channels having the similar priorities and is a minimum unit of the buffer status report. When a random logical channel is set, the node B designates which LCG includes the logical channel.

A buffer status report message transmitted by the UE contains per LCG buffer status. The per LCG buffer status is the sum of the buffer status of all of logical channels belonging to the corresponding LCG. One UE can constitute four LCG at maximum. The lower identifier of the LCG, the higher priority.

In one exemplary embodiment of the present invention, the order and the occurrence frequency of the subheaders are closely related. While the first MAC subheader always exists, the second MAC subheader exists only when two or more PEs are multiplexed in the MAC PDU and the third MAC subheader exists only when three or more PEs are multiplexed in the MAC PDU.

In the order of the MAC subheaders, it is noted that the corresponding MAC subheader generates more frequently when it is the fronter MAC subheader. Considering that one MAC PDU mostly contains one only MAC SDU or MAC CE, it is highly likely that the frequency of the occurrence notably decreases from the second MAC subheader.

When the LCG related to the location of the MAC subheader is fixed, the buffer status of the LCG relating to the first MAC subheader is reported every time the MAC PDU is transmitted, whereas the buffer status of the LCG relating to the other MAC subheaders are reported with the much lower frequency.

Hence, in the one exemplary embodiment of the present invention, the identifier of the LCG relating to the first MAC subheader is determined using the information relating to the transmission time of the MAC PDU so that the identifier of the LCG relating to the first MAC subheader keeps changing.

When the MAC PDU includes the plurality of the MAC subheaders, the MAC subheaders starting from the second MAC subheader are determined from a certain sequence having the determined identifier of the LCG as the start point.

The information relating to the transmission time of the MAC PDU can use information of the time when a reverse grant instructing to send the MAC PDU is received, or information of the time when the MAC PDU is transmitted over the radio channel for the first time.

The identifier of the LCG relating to the first MAC subheader can be derived from one of the following four equations.

$$\text{LCG ID order} = (\text{time information}) \bmod (\text{the number of LCGs set at the UE}) \quad \text{[Eqn. 1]}$$

$$\text{LCG ID order} = [\text{floor}(\text{time information}/P,1)] \bmod (\text{the number of LCGs set at the UE}) \quad \text{[Eqn. 2]}$$

$$\text{LCG ID} = (\text{time information}) \bmod 4 \quad \text{[Eqn. 3]}$$

$$\text{LCG ID} = [\text{floor}(\text{time information}/P,1)] \bmod 4 \quad \text{[Eqn. 4]}$$

In those equations, the time information can be the time when the reverse grant instructing to send the MAC PDU is received, a System Frame Number (SFN) when the MAC PDU is transmitted over the radio channel for the first time, or a value determined by multiplying the SFN by 10 and adding a subframe number.

The SFN is an integer between 0 and 1023, increases by 1 every 10 msec, and broadcast to the cell using system information. The subframe number is an integer between 0 and 9 and increases by 1 every 1 msec.

In the LTE system, a minimum time unit is the subframe and ten subframes constitute one frame. The LCG ID order indicates the order when the LCGs set at the UE are arranged based on the priority.

For example, when a certain UE forms two LCGs including the LCG 0 and the LCG 3, the LCG order 0 represents the LCG 0 which is the highest priority LCG and the LCG order 1 represents the LCG 3 which is the second highest priority LCG.

When a certain UE forms three LCGs including the LCG 0, the LCG 1, and the LCG 3, the LCG order 0 indicates the LCG 0, the LCG order 1 indicates the LCG 1, and the LCG order 2 indicates the LCG 3.

The LCG order is first determined as above. Next, to avoid the calculation of the corresponding LCG identifier, 4 which is the maximum number of the LCGs can be used as expressed in Equation 3 or Equation 4, instead of the number of the LCGs set at the UE.

Equation 2 or Equation 4 is more useful with respect to the UE which is given the reverse grant at regular intervals. In Equation 2, P denotes the period.

For example, when the reverse grant is allocated to a certain UE at intervals of 20 msec, p may be 20 (when the time information is the value determined by multiplying the SFN by 10 and adding the subframe number) and 2 (when the time information is the SFN).

When Equation 2 or Equation 4 is used, the LCG ID order of the LCG ID periodically changes. Thus, the same LCG always involves the first MAC subheader within one period.

Upon determining the identifier of the LCG of which the buffer status is to be reported using the first subheader of the MAC PDU based on one of the equations, the UE determines the identifier of the LCG of which the buffer status is to be reported using the next subheader, from a certain sequence having the identifier as the start point. One of the following sequences can be used.

A sequence which monotonously increases by 1 from 0 to a value determined by subtracting 1 from the number of the LCGs set at the UE and then returns to 0. [Sequence 1]

A sequence which monotonously decreases by 1 from the value determined by subtracting 1 from the number of the LCGs set at the UE to 0 and then returns to the value determined by subtracting 1 from the number of the LCGs set at the UE. [Sequence 2]

A sequence which monotonously increases from 0 to 3 by 1 and the returns to 0. [Sequence 3]

A sequence which monotonously decreases from 3 to 0 by 1 and the returns to 3. [Sequence 4]

Sequence 1 and Sequence 2 are the sets of the LCG order, and Sequence 3 and Sequence 4 are the sets of the LCG identifier. When Equation 1 or Equation 2 is used, one of Sequence 1 and Sequence 2 can be used. When Equation 3 or Equation 4 is used, one of Sequence 3 and Sequence 4 can be used.

When the number of the LCGs set at the UE is 3, Sequence 1 is [0, 1, 2, 0, 1, 2, 0, ... ] and Sequence 2 is [2, 1, 0, 2, 1, 0, 2, 1, 0, ... ].

When Sequence 1 or Sequence 2 is used, the UE calculates the LCG order to use in the next MAC subheader from the sequence using the LCG order relating to the first MAC subheader, and calculates the LCG identifier corresponding to the LCG order.

For example, if the LCG order involving the first MAC subheader is 1, the LCG order involving the second MAC subheader is 2 when Sequence 1 is used and the LCG order involving the second MAC subheader is 0 when Sequence 2 is used.

Figure 4:
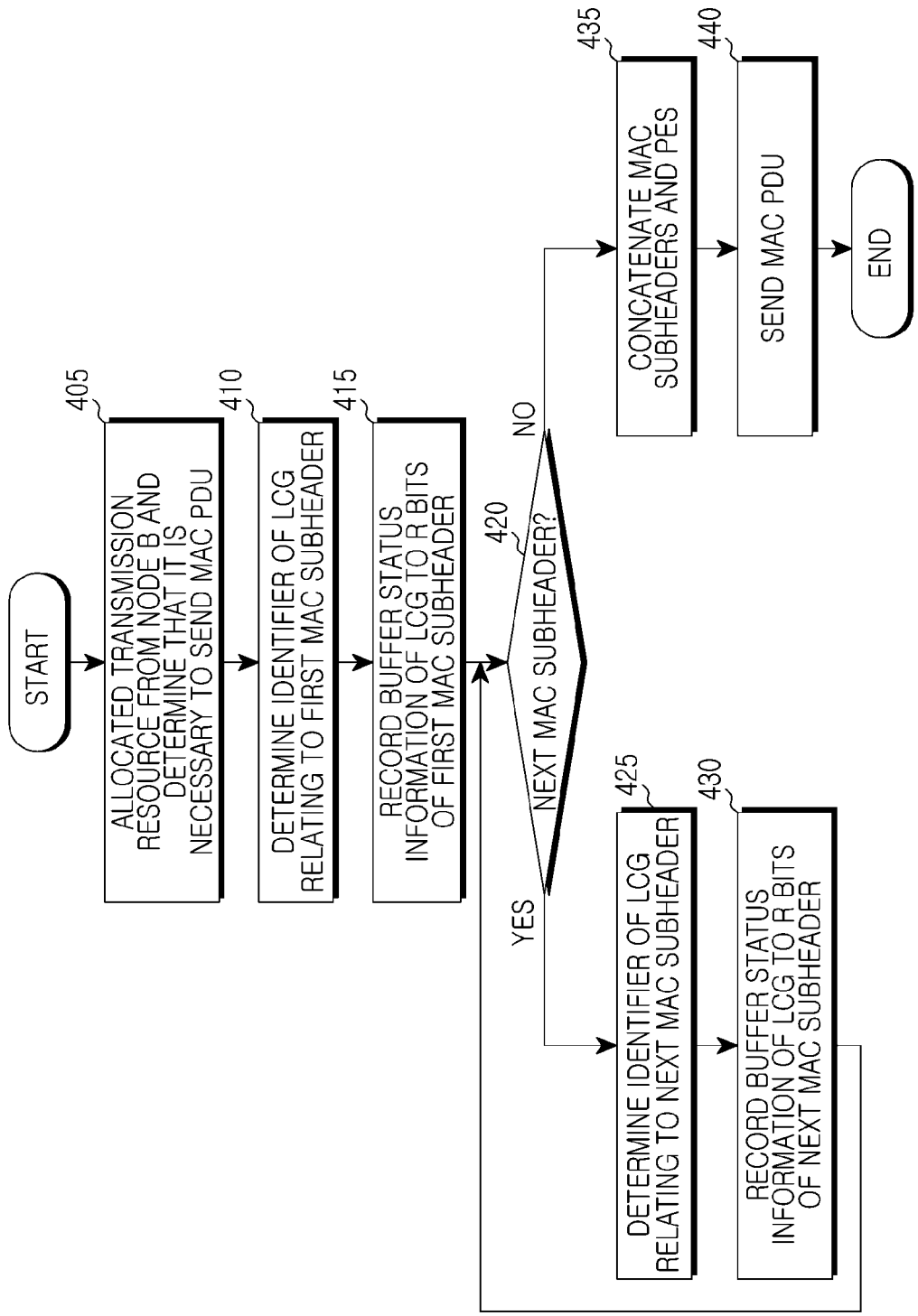
FIG. 4 is a flowchart of operations of a UE according to one exemplary embodiment of the present invention.

FIG. 4 is a flowchart of operations of the UE according to one exemplary embodiment of the present invention.

Referring to FIG. 4, the UE is assigned the transmission resource from the node B and determines that it is necessary to send the MAC PDU in the near future in step 405.

By taking into account the size of the MAC PDU to transmit, the amount of the data stored per logical channel, and the priority of the corresponding logical channel, the UE determines the logical channel for generating the MAC SDUs to be multiplexed to the MAC PDU and the size of each MAC PDU.

The UE determines to constitute and send the MAC SDUs of the determined size to the corresponding logical channel. The UE starts to constitute the MAC subheaders to contain in the MAC PDU.

In step 410, the UE calculates the identifier of the LCG to report of the buffer status through the first MAC subheader using the transmission time of the MAC PDU and the number of the set LCGs.

At this time, Equation 1 or Equation 4 can be used. In step 415, the UE records the information indicative of the buffer status of the LCG to the R bits of the first MAC subheader.

The buffer status recorded to the R bits can be, for example, information indicative of the ratio of the size of the MAC PDU and the amount of the data stored to the buffer of the LCG. When only one of the two R bits is used as the information indicative of the LCG buffer status, 0 can imply that the amount of the data stored to the buffer of the corresponding LCG is less than the MAC PDU, and 1 can imply that the amount of the data stored to the buffer of the corresponding LCG is greater than the MAC PDU.

When the two R bits are used as the information indicative of the LCG buffer status, 0 can imply no data stored to the LCG buffer and 1 can imply that the data amount stored to the LCG buffer is between 0 and the MAC PDU size. 2 can imply that the data amount stored to the LCG buffer is between the MAC PDU size and the multiple of 2 of the MAC PDU size, and 3 can imply that the data amount stored to the LCG buffer is greater than the multiple of 2 of the MAC PDU size.

In step 420, the UE determines whether every MAC subheader is constituted. When every MAC subheader is constituted, the UE proceeds to step 435. When there still remains the MAC subheader to constitute, the UE goes to step 425. In step 425, the UE calculates the identifier of the LCG involving the next MAC subheader.

That is, using the order or the identifier of the LCG involving the first MAC subheader as the start point, the UE calculates the order or the identifier of the next LCG from one of Sequence 1 through Sequence 4.

When the order of the LCG is determined using Sequence 1 or Sequence 2, the UE calculates the LCG identifier from the LCG order. The UE records information indicative of the buffer status of the LCG to the R bits of the corresponding MAC subheader in step 430 and returns to step 420 to determine whether there is the next MAC subheader.

When there are no more MAC subheaders, the UE constitutes the MAC PDU by concatenating the MAC subheaders and the PEs in step 435 and sends the constituted MAC PDU in step 440.

Now, another exemplary embodiment is provided.

As stated earlier, when the relation of the location of the MAC subheader and the LCG is fixed, the buffer status information of the particular LCG is reported far more frequently.

Depending on the type of the logical channels configured at the UE, the node B may want to receive the report of the buffer status of the particular LCG far more frequently. Hence, it can be efficient for the node B to define the particular LCG of which the buffer status is to be recorded in the first MAC subheader.

For example, two logical channels and two logical channel groups are set for the particular UE as shown in Table 1.

TABLE 1

| | Traffic Type | Priority | LCG ID |
|---|---|---|---|
| Logical channel 1 | Wireless Resource Control Protocol | High | 0 |
| Logical channel 2 | FTP Traffic | Low | 3 |

The radio resource control protocol traffic features the rare occurrence of the data of the small amount, and the FTP traffic features the relatively frequent data of the greater amount.

In the conventional buffer status report method, rather than the buffer status report using the R bits, when new data of the highest priority occurs and the corresponding buffer is empty, the buffer status is reported immediately. As a result, it is not that efficient to frequently report the buffer status using the R bits with respect to the data of the highest priority.

It is far more inefficient considering that the conventional buffer status report method provides much more accurate information than the buffer status report method using the R bits.

However, it is preferable to report the buffer status using the R bits with respect to the data of the highest priority in the following setting. Because the streaming data is relatively high capacity data, it is highly likely that the buffer is not empty when new data occurs.

TABLE 2

|  | Traffic Type | Priority | LCG ID |
|---|---|---|---|
| Logical channel 1 | Streaming Data | High | 1 |
| Logical channel 2 | FTP Traffic | Low | 3 |

As above, depending on which type of the service is set, which logical channel is assigned the priority, and which priority is given the logical channel, the LCG to report to the node BS most frequently can vary.

In another exemplary embodiment of the present invention, the node B designates which MAC subheader of the R bits is used to report the buffer status of the LCG and which LCG buffer status is reported, to the UE using a setup message through Radio Resource Control (RRC) signaling.

Figure 5:
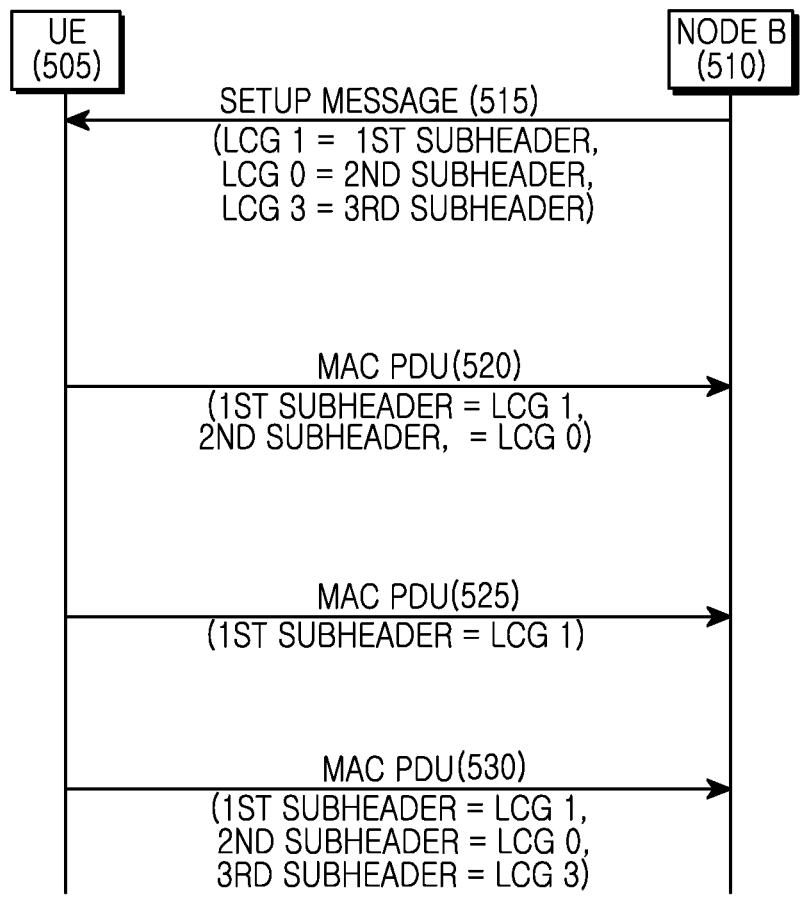
FIG. 5 is a message flow diagram according to another exemplary embodiment of the present invention.

FIG. 5 is a message flow diagram according to another exemplary embodiment of the present invention.

Referring to FIG. 5, the UE 505 receives a setup message from the node B 510 in step 515. The setup message includes information indicating which subheader is related per LCG. For example, the recorded information indicates that the LCG 1 involves the first subheader, the LCG 0 involves the second subheader, and the LCG 3 involves the third subheader.

Next, as sending the MAC PDU in the reverse direction, the UE records the buffer status of the set LCGs to the R bits of the MAC subheader.

For example, when the MAC PDU is transmitted in step 520, the R bits of the first subheader contain the buffer status of the LCG 1 and the R bits of the second subheader contain the buffer status of the LCG 0.

In step 525, as sending the MAC PDU including only one subheader, the UE records the buffer status of the LCG 1 to the R bits of the first subheader.

When sending the MAC PDU including three subheaders in step 530, the UE records the buffer status of the LCG 1 to the R bits of the first subheader, the buffer status of the LCG 0 to the R bits of the second subheader, and the buffer status of the LCG 3 to the R bits of the third subheader.

Figure 6:
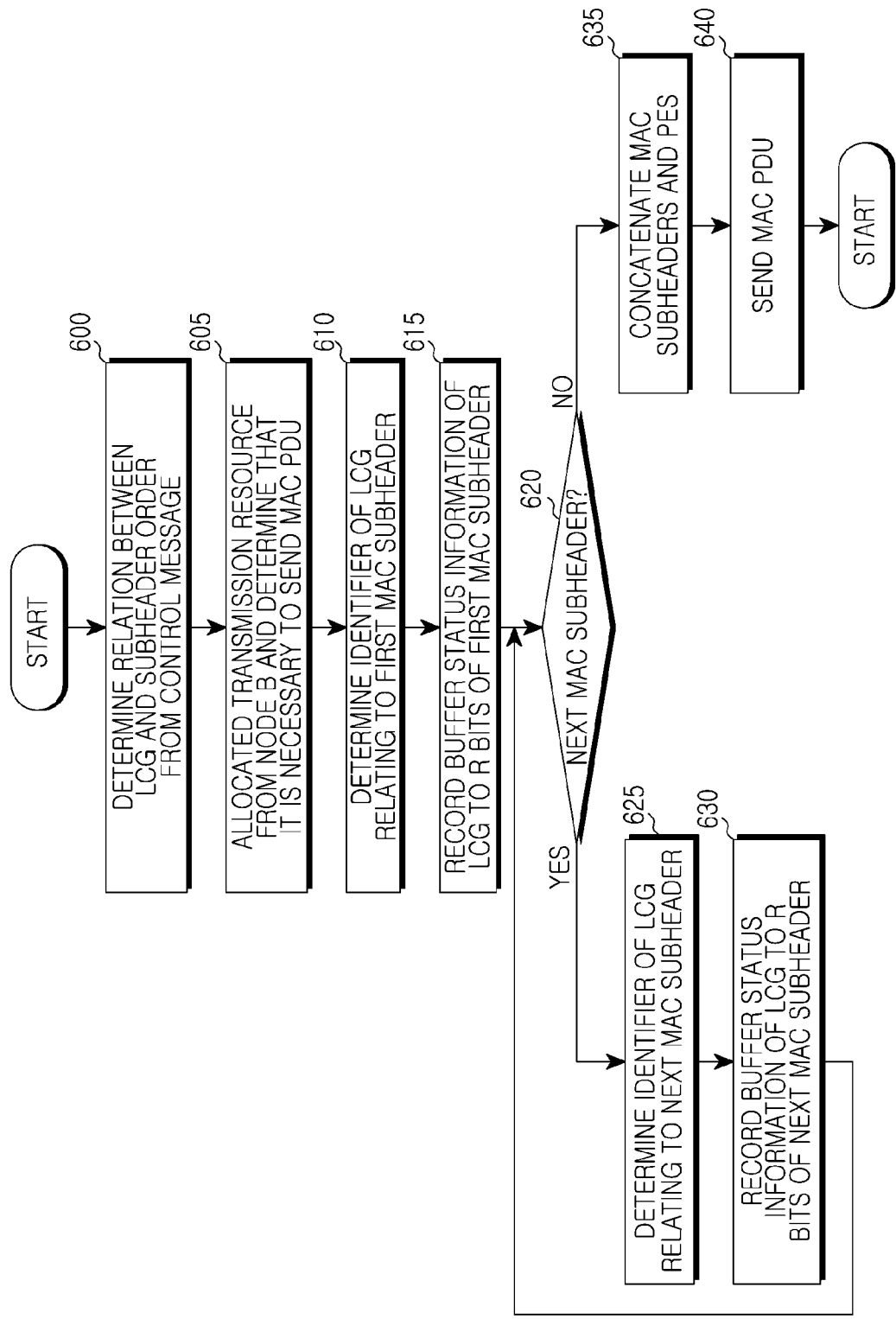
FIG. 6 is a flowchart of operations of the UE according to another exemplary embodiment of the present invention.

FIG. 6 is a flowchart of operations of the UE according to another exemplary embodiment of the present invention.

Referring to FIG. 6, the UE receives the information indicating which MAC subheaders are related to the respective LCGs through a control message in step 600.

When a certain LCG involves the x-th MAC subheader, this implies that the R bits of the x-th MAC subheader of the MAC PDU transmitted at a certain time contains the information indicative of the buffer status of the LCG.

Hereafter, to ease the understanding, the information indicative of the relation between the LCGs and the MAC subheader order is referred to as LCG-MAC subheader information.

In step 605, the UE is assigned the transmission resource from the node B and determines that it is necessary to send the MAC PDU.

By taking into account the size of the MAC PDU to transmit, the amount of the data stored per logical channel, and the priority of the corresponding logical channel, the UE determines the logical channel for generating the MAC SDUs to be multiplexed to the MAC PDU and the size of each MAC PDU.

The UE determines to constitute and send the MAC SDUs of the determined size to the corresponding logical channel.

The UE starts to constitute the MAC subheaders to include to the MAC PDU. In step 610, the UE determines the LCG to report of the buffer status through the first MAC subheader by referring to the LCG-MAC subheader information.

That is, the UE confirms the identifier of the LCG relating to the first MAC subheader in the LCG-MAC subheader information. In step 615, the UE records the information indicative of the buffer status of the LCG to the R bits of the first MAC subheader.

In step 620, the UE determines whether every MAC subheader is constituted. When every MAC subheader is constituted, the UE proceeds to step 635. When there still remains the MAC subheader to constitute, the UE goes to step 625.

In step 625, the UE determines the identifier of the LCG involving the next MAC subheader based on the LCG-MAC subheader information. For example, as constituting the x-th MAC subheader, the UE confirms the identifier of the LCG involving the x-th MAC subheader from the LCG-MAC subheader information.

The UE records the information indicative of the buffer status of the LCG to the R bits of the corresponding MAC subheader in step 630 and returns to step 620 to determine whether there is the next MAC subheader.

When there is no more MAC subheader, the UE constitutes the MAC PDU by concatenating the MAC subheaders and the PEs in step 635 and sends the constituted MAC PDU in step 640.

Now, still another exemplary embodiment is provided.

The weak point of the current buffer status report method is that no buffer report message is issued even when a lot of data generates in the logical channel of the low priority.

To overcome this shortcoming, still another embodiment of the present invention provides a method for recording the identifier of the LCG of the most recent data to the R bits of the first MAC subheader regardless of the priority and recording the information indicative of the buffer status of the LCG to the R bits of the second MAC subheader.

Figure 7:
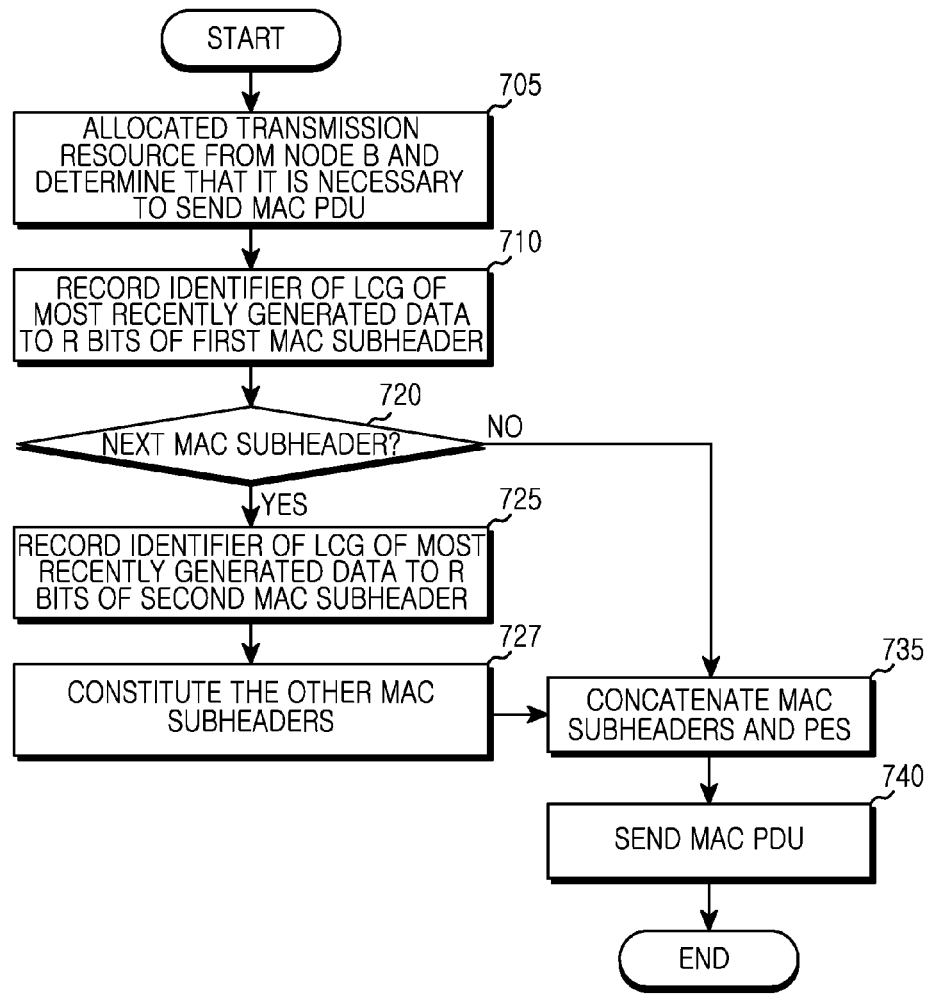
FIG. 7 is a flowchart of operations of the UE according to still another exemplary embodiment of the present invention.

FIG. 7 is a flowchart of operations of the UE according to still another exemplary embodiment of the present invention.

Referring to FIG. 7, the UE is assigned the transmission resource from the node B and determines that it is necessary to send the MAC PDU in the near future in step 705. By taking into account the size of the MAC PDU to transmit, the amount of the data stored per logical channel, and the priority of the corresponding logical channel, the UE determines the logical channel for generating the MAC SDUs to be multiplexed to the MAC PDU and the size of each MAC SDU.

The UE determines to constitute and send the MAC SDUs of the determined size to the corresponding logical channel. The UE starts to constitute the MAC subheaders to include to the MAC PDU.

In step 710, the UE records the identifier of the LCG of the most recently generated data to the R bits of the first MAC subheader. In step 720, the UE determines whether every MAC subheader is constituted. When every MAC subheader is constituted, the UE proceeds to step 735. When there still remains the MAC subheader to constitute, the UE goes to step 725.

In step 725, the UE records the information indicative of the buffer status of the LCG of the most recently generated data to the R bits of the second MAC subheader. After constituting the other MAC subheaders in step 727, the UE constitutes the MAC PDU by concatenating the MAC subheaders and the PEs in step 735 and sends the constituted MAC PDU in step 740.

Figure 8:
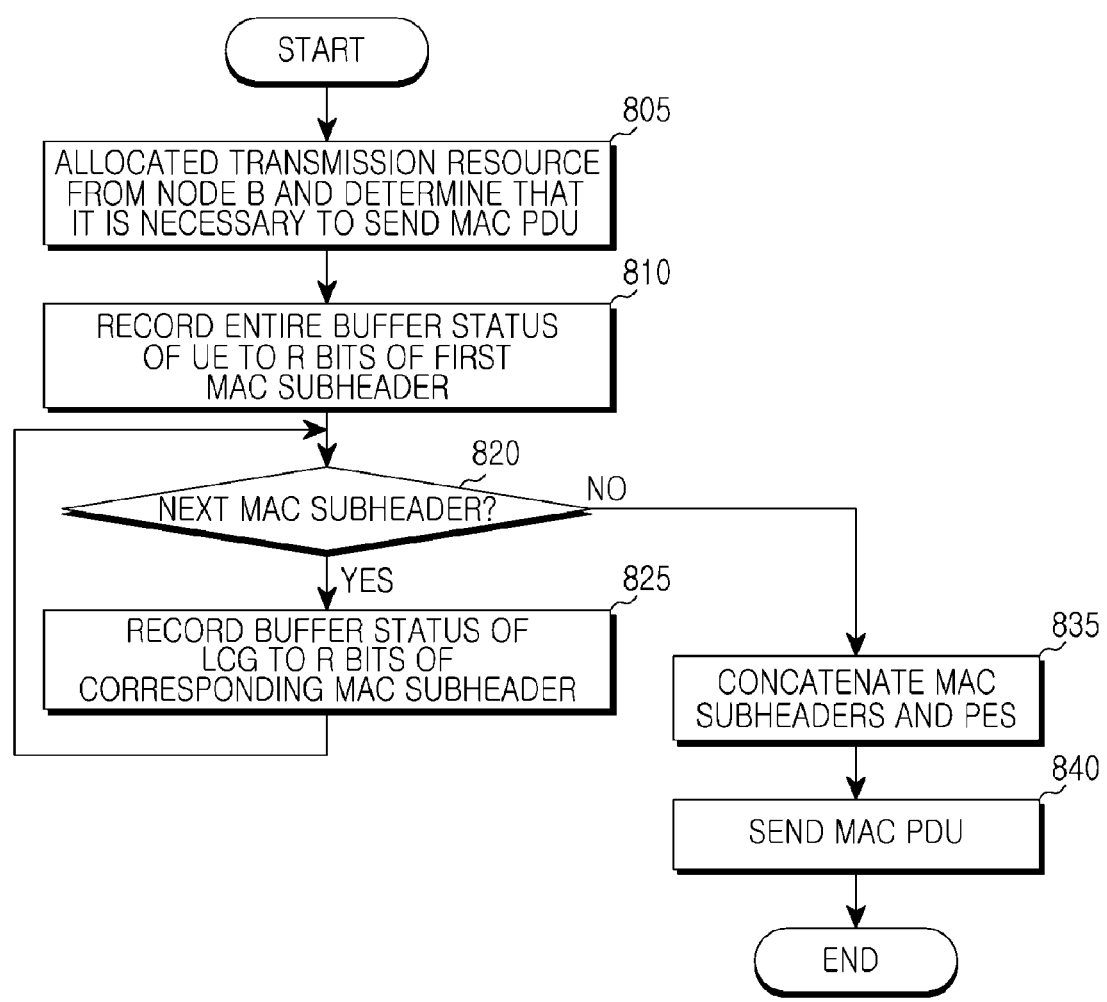
FIG. 8 is a flowchart of operations of the UE according to yet another exemplary embodiment of the present invention.

FIG. 8 is a flowchart of operations of the UE according to yet another exemplary embodiment of the present invention.

Referring to FIG. 8, the UE is assigned the transmission resource from the node B and determines that it is necessary to send the MAC PDU in the near future in step 805. By taking into account the size of the MAC PDU to transmit, the amount of the data stored per logical channel, and the priority of the corresponding logical channel, the UE determines the logical channel for generating the MAC SDUs to be multiplexed to the MAC PDU and the size of each MAC SDU.

The UE determines to constitute and send the MAC SDUs of the determined size to the corresponding logical channel. The UE starts to constitute the MAC subheaders to include to the MAC PDU.

In step 810, the UE records its entire buffer status to the R bits of the first MAC subheader. In step 820, the UE determines whether every MAC subheader is constituted. When every MAC subheader is constituted, the UE proceeds to step 835. When there still remains the MAC subheader to constitute, the UE goes to step 825.

In step 825, the UE records the buffer status of the LCG 1 to the R bits of the second MAC subheader. When there still remains the MAC subheader to constitute in step 820, the UE records the buffer status of the corresponding LCG to the R bits of the corresponding MAC subheader in the priority order.

Since the significance of the buffer status of the LCG is proportional to the priority of the LCG, it is appropriate to record the buffer status of the LCG 0 to the second subheader. However, when new data occurs to the LCG 0, the BSR is always triggered. Only SRB0/1/2 is mostly mapped to the LCG 0 and intermittently generates the small-size data. In this regard, it is unnecessary to report of the buffer status in relation to the LCG 0. Thus, the second MAC subheader reports the buffer status of the LCG 1. Hereafter, the per LCG buffer status is reported in the priority order.

The UE constitutes the MAC PDU by concatenating the MAC subheaders and the PEs in step 835 and sends the constituted MAC PDU in step 840.

Figure 9:
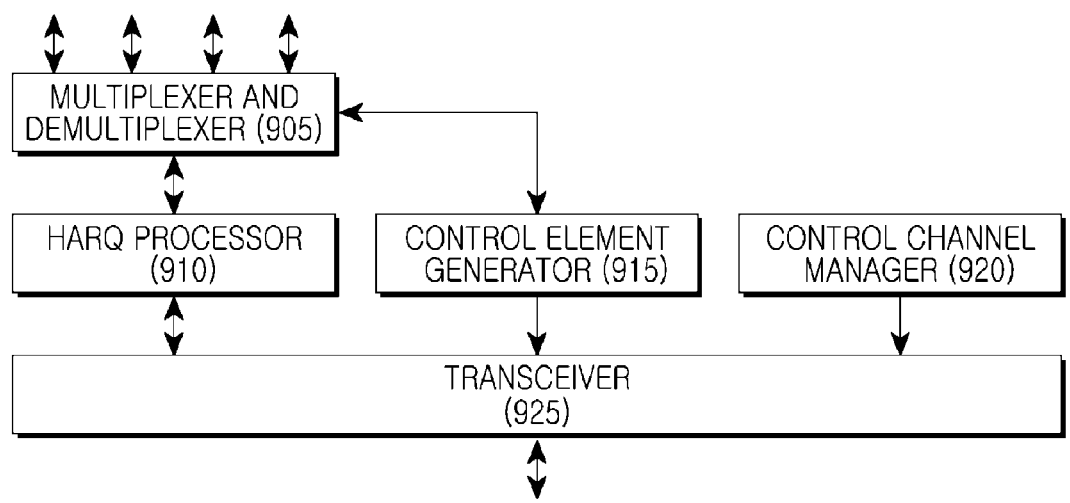
FIG. 9 is a block diagram of a node B apparatus or the UE apparatus according to an exemplary embodiment of the present invention.

FIG. 9 is a block diagram of a node B apparatus or a UE apparatus according to an exemplary embodiment of the present invention.

Referring to FIG. 9, the node B apparatus or the UE apparatus includes a multiplexer and a demultiplexer 905, a HARQ processor 910, a control element generator 915, a control channel manager 920, and a transceiver 925. The same modules as in the upper layer are not illustrated in FIG. 9.

First, the UE is mainly explained.

The control element generator 915 determines the identifier of the LCG relating to the order of the MAC header element. When the MAC PDU is transmitted, the control element generator 915 generates the control element to record to the MAC header elements; that is, the buffer status information of the LCGs or the identifier of the LCG of the most recently generated data and forwards the generated information to the multiplexer and demultiplexer 905. That is, the control element generator 915 generates the information indicative of the buffer status of the UE as determined in those exemplary embodiments of the present invention, and forwards the generated information to the multiplexer and demultiplexer 905. The control element generator 915 determines the information relating to the relation between the LCG and the MAC subheader by signaling with the node B.

The control element manager 920 processes forward and reverse control channels. For example, the control element manager 920 determines whether to schedule by analyzing the forward control information. The control element manager 920 handles the signaling connection such as RRC connection.

The transceiver 925 transmits and receives the MAC PDU or the control element over the radio channel.

The HARQ processor 910 transmits and receives HARQ packets. For the HARQ operation, the HARQ processor 910 includes a set of soft decision buffers, which are distinguished using a HARQ process identifier.

The multiplexer and demultiplexer 905 generates the MAC subheaders and constitutes the MAC PDU by concatenating them with the MAC SDUs received from the upper layer.

The R bits of each MAC subheader contain the control element received from the control element generator 915. The constituted MAC PDU is transmitted from the transceiver 925 via the multiplexer and demultiplexer 905 or the control element generator 915 according to the transmission situation.

As for the node B, other operations are similar to the operations of the UE but a difference lies in that the control element generator 915 determines and provides the information indicative of the buffer status of the UE to the multiplexer and demultiplexer 905.

The present invention allows the UE to report its buffer status to the node B more efficiently, and the node B to efficiently determine the buffer status of the UE.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for reporting buffer status of a User Equipment (UE) in a mobile communication system, the method comprising:
    being allocated a transmission resource from a node B;
    determining a buffer state report related to a Logical Control Group (LCG) by a Medium Access Control (MAC) layer to add to a reserved bit region of a first MAC subheader through an N-th MAC subheader using the transmission resource;
    generating a MAC Protocol Data Unit (PDU) by concatenating the first MAC subheader through the N-th MAC subheader with corresponding payload elements; and
    transmitting the generated MAC PDU,
    wherein the first MAC subheader includes at least one of:
        buffer status of an LCG corresponding to an identifier of an LCG relating to the first MAC subheader;
        LCG buffer status of an identifier of an LCG relating to the first MAC subheader;
        and
        entire buffer status of the UE.

2. The method of claim 1, wherein the determining of the buffer state report to add to the reserved bit region of the first MAC subheader through the N-th MAC subheader using the transmission resource comprises:
    determining the identifier of the LCG relating to the first MAC subheader using information relating to a transmission time of the MAC PDU so that the LCG identifier relating to the MAC subheader keeps changing;
    recording the buffer status of the LCG corresponding to the determined identifier to a reserved bit region of the first MAC subheader;
    when there is a plurality of MAC subheaders in the MAC PDU, determining a certain sequence having the determined LCG identifier as a start point; and
    recording buffer status of an LCG corresponding to the identifier determined by the certain sequence to the reserved bit region of the corresponding MAC subheader from the second MAC subheader to the N-th MAC subheader.

3. The method of claim 1, wherein the determining of the buffer state report to add to the reserved bit region of the first MAC subheader through the N-th MAC subheader using the transmission resource comprises:
  determining the identifier of the LCG relating to the first through N-th MAC subheaders, from the transmission resource;
  recording LCG buffer status of the identifier relating to the first MAC subheader to a reserved bit region of the first MAC subheader; and
  when there is a plurality of MAC subheaders in the MAC PDU, recording LCG buffer status of the identifiers relating to the second MAC subheader through the N-th MAC subheader in a reserved bit region of the second MAC subheader through the N-th subheader.

4. The method of claim 1, wherein the determining of the buffer state report to add to the reserved bit region of the first MAC subheader through the N-th MAC subheader using the transmission resource comprises:
  recording the identifier of the LCG of most recently generated data in a reserved bit region of the first MAC subheader; and
  when there is a plurality of MAC subheaders in the MAC PDU, recording buffer status of the LCG of the most recently generated data in a reserved bit region of the second MAC subheader.

5. The method of claim 1, wherein the determining of the buffer state report to add to the reserved bit region of the first MAC subheader through the N-th MAC subheader using the transmission resource comprises:
  recording the entire buffer status of the UE in the reserved bit region of the first MAC subheader; and
  when there is a plurality of MAC subheaders in the MAC PDU, recording buffer status of an LCG 1 in a reserved bit region of the second MAC subheader; and
  recording buffer status of a corresponding LCG in a reserved bit region of a corresponding MAC subheader of the third MAC subheader through the N-th subheader based on a priority of the LCG.

6. The method of claim 1, wherein the N-th MAC subheader is the last MAC subheader.

7. A method for informing of a buffer transmission order of a User Equipment (UE) at a node B in a mobile communication system, the method comprising:
  establishing a Radio Resource Control (RRC) connection with the UE;
  designating which Medium Access Control (MAC) subheader is used to report a buffer state related to a Logical Control Group (LCG) by a MAC layer;
  sending the information relating to the designation through the RRC connection; and
  receiving a MAC Protocol Data Unit (PDU) comprising a first MAC subheader through an N-th MAC subheader concatenated with corresponding payload elements,
  wherein the first MAC subheader includes at least one of:
    buffer status of an LCG corresponding to an identifier of an LCG relating to the first MAC subheader;
    LCG buffer status of an identifier of an LCG relating to the first MAC subheader;
    and
    entire buffer status of the UE.

8. An apparatus of a User Equipment (UE) for reporting buffer status in a mobile communication system, the apparatus comprising:
  a control element generator configured to be allocated a transmission resource from a node B, and to determine a buffer state report related to a Logical Control Group (LCG) by a Medium Access Control (MAC) layer to add to a reserved bit region of a first MAC subheader through an N-th MAC subheader using the transmission resource;
  a multiplexer and demultiplexer configured to generate a MAC Protocol Data Unit (PDU) by concatenating the first MAC subheader through the N-th MAC subheader with corresponding payload elements according to the determination of the control element generator; and
  a transceiver configured to transmit the generated MAC PDU,
  wherein the first MAC subheader includes at least one of:
    buffer status of an LCG corresponding to an identifier of an LCG relating to the first MAC subheader;
    LCG buffer status of an identifier of an LCG relating to the first MAC subheader;
    and
    entire buffer status of the UE.

9. The apparatus of claim 8, wherein the control element generator determines the identifier of the LCG relating to the first MAC subheader using information relating to a transmission time of the MAC PDU so that the LCG identifier relating to the MAC subheader keeps changing,
  determines to record buffer status of the LCG corresponding to the determined identifier to a reserved bit region of the first MAC subheader,
  when there is a plurality of MAC subheaders in the MAC PDU, determines a certain sequence having the determined LCG identifier as a start point, and
  determines to record buffer status of an LCG corresponding to the identifier determined by the certain sequence to the reserved bit region of the corresponding MAC subheader from the second MAC subheader to the N-th MAC subheader.

10. The apparatus of claim 8, wherein the control element generator determines the identifier of the LCG relating to the first through N-th MAC subheaders, from the transmission resource,
  determines to record the LCG buffer status of the identifier relating to the first MAC subheader to a reserved bit region of the first MAC subheader, and
  when there is a plurality of MAC subheaders in the MAC PDU, determines to record LCG buffer status of the identifiers relating to the second MAC subheader through the N-th MAC subheader in a reserved bit region of the second MAC subheader through the N-th subheader.

11. The apparatus of claim 8, wherein the control element generator determines to record the identifier of the LCG of most recently generated data in a reserved bit region of the first MAC subheader, and
  when there is a plurality of MAC subheaders in the MAC PDU, determines to record buffer status of the LCG of the most recently generated data in a reserved bit region of the second MAC subheader.

12. The apparatus of claim 8, wherein the control element generator determines information to add to the reserved bit region of the first MAC subheader through the N-th MAC subheader using the transmission resource,
  determines to record the entire buffer status of the UE in a reserved bit region of the first MAC subheader,
  when there is a plurality of MAC subheaders in the MAC PDU, determines to record buffer status of an LCG 1 in a reserved bit region of the second MAC subheader, and determines to record buffer status of a corresponding LCG in a reserved bit region of a corresponding MAC subheader of the third MAC subheader through the N-th subheader based on a priority of the LCG.

13. The apparatus of claim 8, wherein the N-th MAC subheader is the last MAC subheader.

14. An apparatus of a node B for informing of a buffer transmission order of a User Equipment (UE) in a mobile communication system, the apparatus comprising:
- a control channel process configured to establish a Radio Resource Control (RRC) connection with the UE;
- a control element generator configured to designate which Medium Access Control (MAC) subheader is used to report a buffer state related to a Logical Control Group (LCG) by a MAC layer; and
- a transceiver configured to send the information relating to the designation through the RRC connection and to receive a MAC Protocol Data Unit (PDU) comprising a first MAC subheader through an N-th MAC subheader concatenated with corresponding payload elements,
- wherein the first MAC subheader includes at least one of:
  - buffer status of an LCG corresponding to an identifier of an LCG relating to the first MAC subheader;
  - LCG buffer status of an identifier of an LCG relating to the first MAC subheader;
  - and
  - entire buffer status of the UE.

* * * * *